US011895159B2

(12) United States Patent
Colonna et al.

(10) Patent No.: US 11,895,159 B2
(45) Date of Patent: Feb. 6, 2024

(54) SECURITY CAPABILITY DETERMINATION

(71) Applicant: International Business Machines Corporation, Armonk, NY (US)

(72) Inventors: Christopher J Colonna, Ossining, NY (US); Stephen Robert Guendert, Poughkeepsie, NY (US); Pasquale A. Catalano, Wallkill, NY (US); Michael James Becht, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 17/363,070

(22) Filed: Jun. 30, 2021

(65) Prior Publication Data
US 2023/0007051 A1    Jan. 5, 2023

(51) Int. Cl.
H04L 9/40 (2022.01)
H04L 43/065 (2022.01)
G06Q 10/10 (2023.01)
G06Q 10/0635 (2023.01)

(52) U.S. Cl.
CPC ....... *H04L 63/205* (2013.01); *G06Q 10/0635* (2013.01); *G06Q 10/10* (2013.01); *H04L 43/065* (2013.01)

(58) Field of Classification Search
None
See application file for complete search history.

(56) References Cited

U.S. PATENT DOCUMENTS

| 9,237,306 | B2 | 1/2016 | Vijayakumar |
| 9,876,717 | B2 | 1/2018 | Alkhatib |
| 10,079,877 | B2 | 9/2018 | Paramasivam |
| 10,764,291 | B2 | 9/2020 | Driever |
| 10,833,856 | B2 | 11/2020 | Hathorn |
| 10,833,860 | B2 | 11/2020 | Driever |
| 11,025,413 | B2 | 6/2021 | Driever |
| 11,038,671 | B2 | 6/2021 | Driever |
| 11,038,698 | B2 | 6/2021 | Driever |
| 2005/0235342 | A1* | 10/2005 | Ene-Pietrosanu ..... G06F 21/602 726/6 |

(Continued)

OTHER PUBLICATIONS

"A cognitive system to assess as soon as possible security exposures in a customer environment", An IP.com Prior Art Database Technical Disclosure, Authors et al.: Disclosed Anonymously, IP.com No. IPCOM000249244D, IP.com Electronic Publication Date: Feb. 14, 2017, 6 pages.

(Continued)

*Primary Examiner* — Kaveh Abrishamkar
(74) *Attorney, Agent, or Firm* — Gilbert Harmon, Jr.

(57) ABSTRACT

An approach for improving endpoint security. The approach requests security capabilities from endpoints of communications. The approach can analyze the differences between the security capabilities of the endpoints. The approach can negotiate a security capability supported by the endpoints of the communication. The approach can determine if the negotiation succeeded. If the negotiation failed, then the approach can create a report describing capabilities of the endpoints and suggesting changes to improve the endpoint security. The approach can send the report to the appropriate interested personnel.

20 Claims, 5 Drawing Sheets

(56) References Cited

U.S. PATENT DOCUMENTS

| | | | |
|---|---|---|---|
| 2009/0040970 A1* | 2/2009 | Ahmadi | H04B 7/2612 370/329 |
| 2009/0217347 A1* | 8/2009 | Chen | H04L 45/00 726/1 |
| 2009/0298471 A1* | 12/2009 | He | H04W 12/108 455/411 |
| 2010/0095123 A1* | 4/2010 | He | H04L 9/0844 713/171 |
| 2013/0057895 A1* | 3/2013 | Okazawa | G06F 21/33 358/1.14 |
| 2013/0227272 A1* | 8/2013 | Cox | H04L 63/205 713/151 |
| 2017/0046143 A1* | 2/2017 | Kochhar | G06F 8/71 |
| 2020/0076581 A1 | 3/2020 | Driever | |
| 2020/0076582 A1 | 3/2020 | Driever | |
| 2020/0076618 A1 | 3/2020 | Driever | |
| 2021/0176283 A1* | 6/2021 | Ippatapu | H04L 67/1095 |

OTHER PUBLICATIONS

"EqualLogic iSCSI SAN Concepts for the Experienced Fibre Channel Storage Professional", Dell EqualLogic Best Practices Series, Storage Infrastructure and Solutions Engineering, Dell Product Group, Jan. 2012, 20 pages.

"Method for Security Policy Deployment on Heterogeneous Network and End-Point Devices Using an Integrated Data Model and Capability Knowledge", An IP.com Prior Art Database Technical Disclosure, Authors et. al.: Disclosed Anonymously, IP.com No. IPCOM000012552D, IP.com Electronic Publication Date: May 14, 2003, 6 pages.

Beaver, Donald, "Network Security and Storage Security: Symmetries and Symmetry-Breaking", Conference Paper, Jan. 2003, DOI: 10.1109/SISW.2002.1183504, 8 pages.

Crawford et al., "Multi-Factor Authentication in Physical Security Environments Using Wireless Identity and Location Tracking", An IP.com Prior Art Database Technical Disclosure, IP.com No. IPCOM000253748D, IP.com Electronic Publication Date: Apr. 30, 2018, Copyright: Copyright 2018 Cisco Systems, Inc., 11 pages.

Mell et al., "The NIST Definition of Cloud Computing", Recommendations of the National Institute of Standards and Technology, Special Publication 800-145, Sep. 2011, 7 pages.

Seewald, Maik, "Blockchain-Based Confirmation of Endpoint State in Networks", An IP.com Prior Art Database Technical Disclosure, IP.com No. IPCOM000249852D, IP.com Electronic Publication Date: Apr. 18, 2017, Copyright: Copyright 2017 Cisco Systems, Inc., 5 pages.

* cited by examiner

SECURITY CAPABILITY DETERMINATION

TECHNICAL FIELD

The present invention relates generally to security capabilities and more specifically, determining security capabilities associated with an endpoint.

BACKGROUND

Fibre Channel is the premier transport for Storage Area Networks (SAN). However, like any other component of a datacenter, the need to implement security measures in the SAN exists to reduce and eliminate insider threats of unauthorized access of data. Managing a SAN involves not only providing highly available data access and optimal performance, but it's also essential that all data on the SAN be completely secure.

Currently, defined combinations of endpoint security settings are sometimes interoperable but it can easily follow that mismatched components can lead to incompatible combinations of security settings. For example, channels may be required to drop support for algorithms deemed not quantum safe, yet still be in the same environment as a legacy channel and policies may require the use of a minimum level of encryption.

When endpoints fail to enable security, it can currently be inferred that it is for policy reasons, but in the future, the basis for the failure to enable security settings will be less obvious. Accordingly, a need has arisen for a mechanism to determine the security settings associated with the endpoints of a Fibre Channel connection.

BRIEF SUMMARY

According to an embodiment of the present invention, a computer-implemented method for improving endpoint security, the computer-implemented method comprising: requesting security capabilities from one or more endpoints; analyzing the difference between the security capabilities; negotiating a security capability supported by the one or more endpoints; determining if the negotiating succeeded; responsive to the negotiating not succeeding, creating a report describing capabilities associated with the one or more endpoints and suggesting changes for at least one of the one or more endpoints; and sending the report to predetermined interested personnel.

According to an embodiment of the present invention, a computer program product for improving endpoint security, the computer program product comprising: one or more nontransitory computer readable storage media and program instructions stored on the one or more non-transitory computer readable storage media, the program instructions comprising: program instructions to request security capabilities from one or more endpoints; program instructions to analyze the difference between the security capabilities; program instructions to negotiate a security capability supported by the one or more endpoints; program instructions to determining if the negotiating succeeded; responsive to the negotiating failing, program instructions to create a report describing capabilities associated with the one or more endpoints and suggesting changes for at least one of the one or more endpoints; and program instructions to send the report to predetermined interested personnel.

According to an embodiment of the present invention, a computer system for improving endpoint security, the computer system comprising: one or more computer processors; one or more non-transitory computer readable storage media; and program instructions stored on the one or more non-transitory computer readable storage media, the program instructions comprising: program instructions to request security capabilities from one or more endpoints; program instructions to analyze the difference between the security capabilities; program instructions to negotiate a security capability supported by the one or more endpoints; program instructions to determining if the negotiating succeeded; responsive to the negotiating failing, program instructions to create a report describing capabilities associated with the one or more endpoints and suggesting changes for at least one of the one or more endpoints; and program instructions to send the report to predetermined interested personnel.

Other aspects and embodiments of the present invention will become apparent from the following detailed description, which, when taken in conjunction with the drawings, illustrate by way of example the principles of the invention.

DETAILED DESCRIPTION

Figure 1:
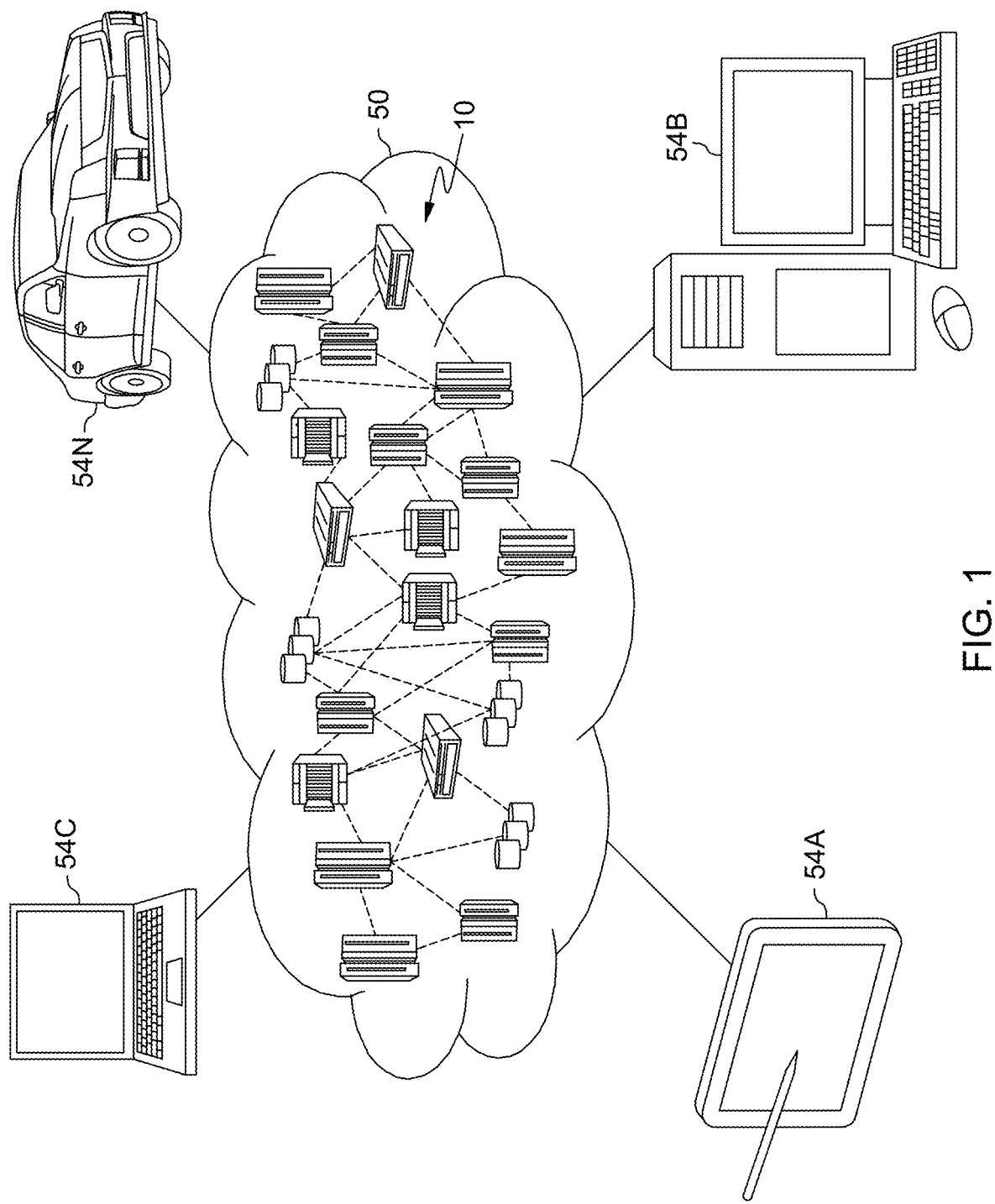
FIG. 1 depicts a cloud computing environment, according to embodiments of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of determining the security capabilities of an endpoint. It should be noted that an endpoint can be any device that is physically an end point on a network. Examples of end points include, but are not limited to, laptops, desktops, mobile phones, tablets, servers, and virtual environments. Further, an example of endpoint security can include, but is not limited to, a traditional home antivirus, the desktop, laptop, or smartphone that antivirus is installed on is the endpoint.

An embodiment can request security capabilities from an endpoint and can analyze the security capabilities in view of the security capabilities of another endpoint associated with communications between the two endpoints. Further, another example of endpoint security can include, but is not limited to, the IBM Fiber Channel Endpoint Security, by IBM Corporation, policies supported by the endpoint devices, such as encryption or authentication. The analysis can be used for troubleshooting and notification or enforcement of best practices. It should be noted that endpoint security can refer to cybersecurity services for network endpoints.

Endpoint security services can include antivirus, email filtering, web filtering, and firewall services. Endpoint security can play a crucial role for businesses, ensuring critical systems, intellectual property, customer data, employees, and guests are protected from ransomware, phishing, malware, and other cyberattacks. Without these endpoint protections in place, entities could lose access to their valuable data or risk having their data stolen while the data travels over the attached network. Repeat infections and data breaches can also lead to costly downtime and the allocation of resources to remediating issues.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
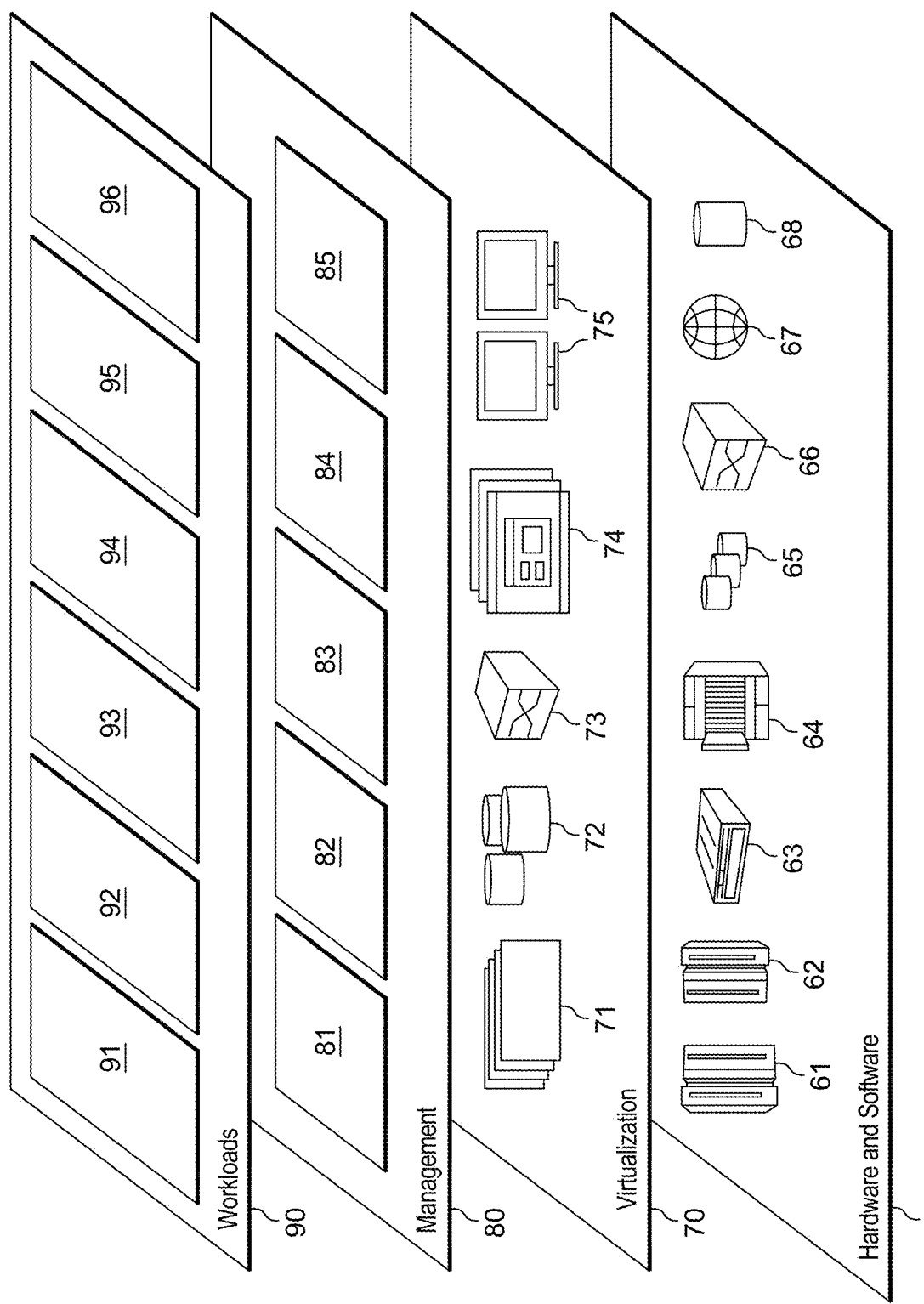
FIG. 2 depicts abstraction model layers, according to embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 include hardware and software components. Examples of hardware components include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and endpoint security optimization management 96.

It should be noted that the embodiments of the present invention may operate with a user's permission. Any data may be gathered, stored, analyzed, etc., with a user's consent. In various configurations, at least some of the embodiments of the present invention are implemented into an opt-in application, plug-in, etc., as would be understood by one having ordinary skill in the art upon reading the present disclosure.

Figure 3:
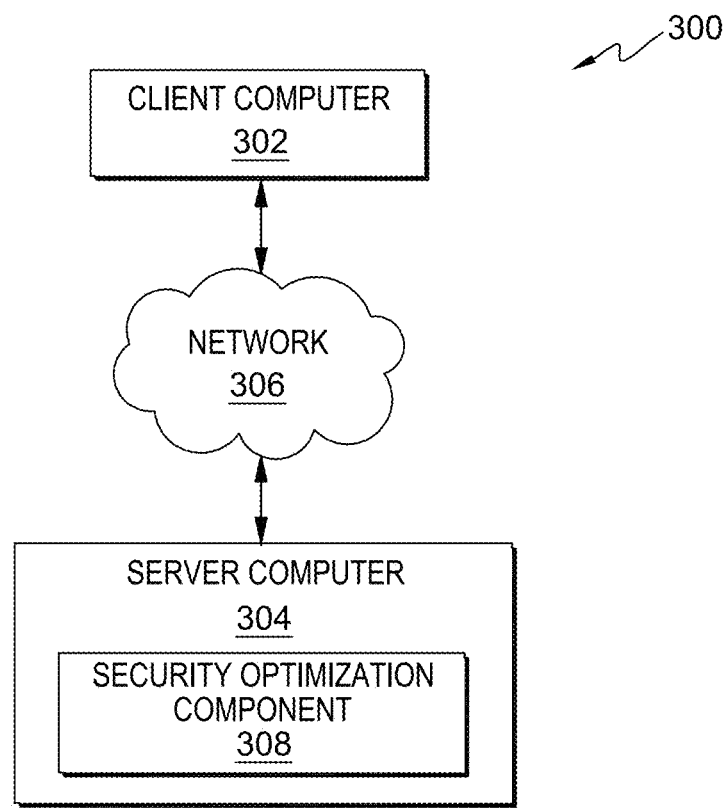
FIG. 3 is a high-level architecture, according to embodiments of the present invention.
Figure 4:
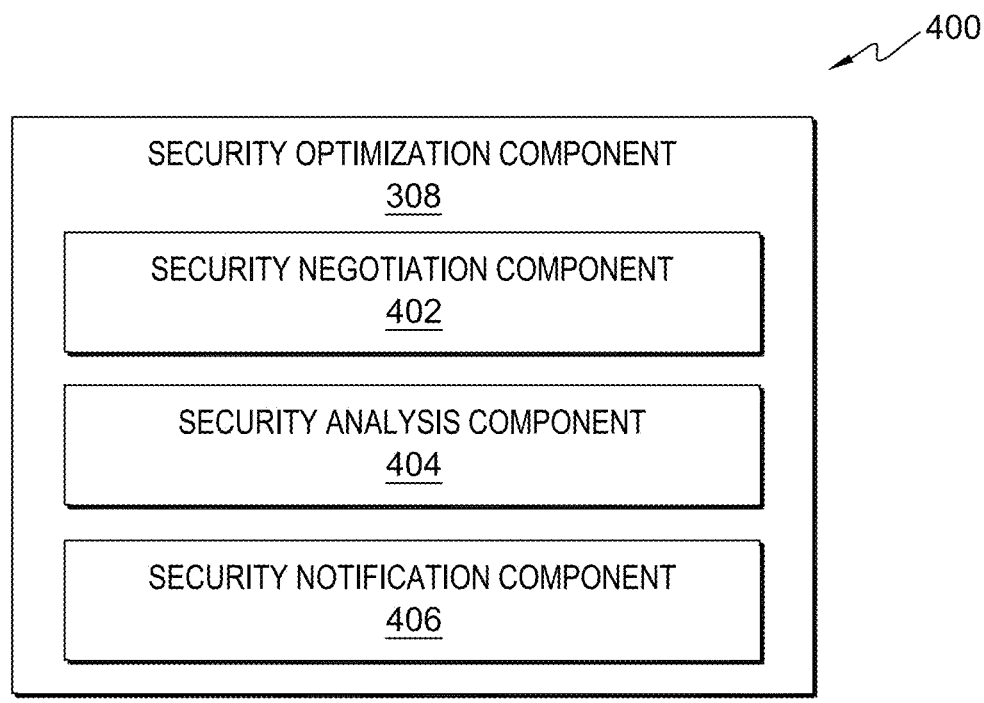
FIG. 4 is an exemplary detailed architecture, according to embodiments of the present invention.
Figure 5:
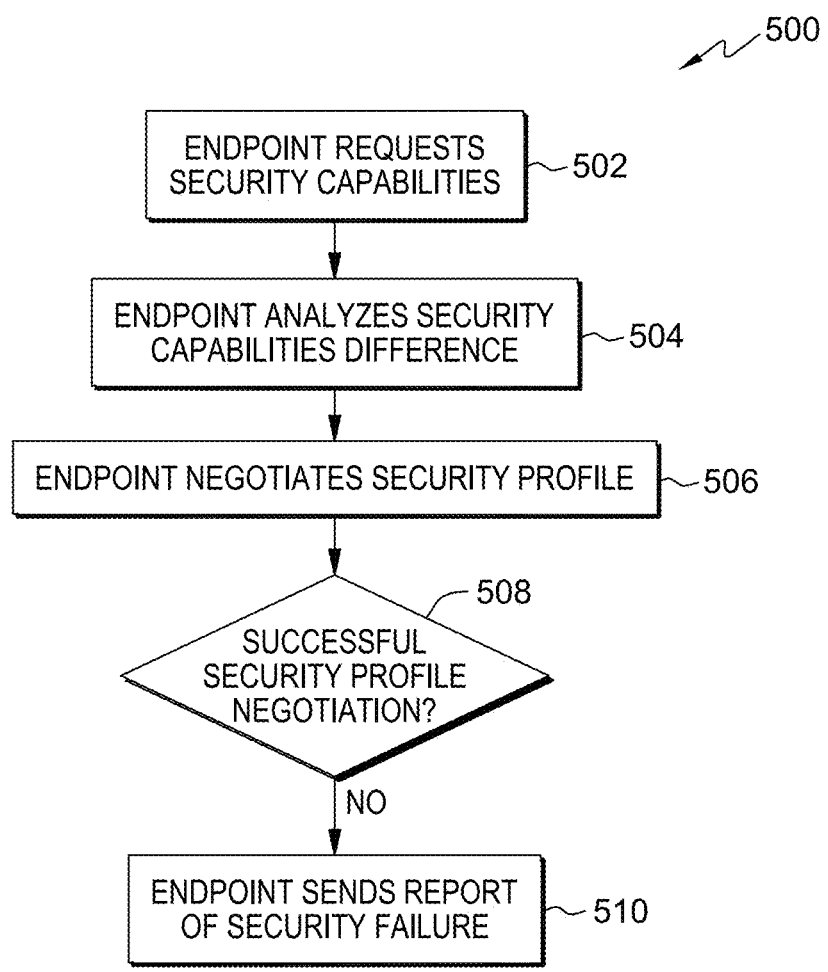
FIG. 5 is a flowchart of a method, according to embodiments of the present invention.

FIG. 3 is a high-level architecture for performing various operations of FIG. 5, in accordance with various embodiments. The architecture 300 may be implemented in accordance with the present invention in any of the environments depicted in FIGS. 1-4, among others, in various embodiments. Of course, more or less elements than those specifically described in FIG. 3 may be included in architecture 300, as would be understood by one of ordinary skill in the art upon reading the present descriptions.

Each of the steps of the method 500 (described in further detail below) may be performed by any suitable component of the architecture 300. A processor, e.g., processing circuit(s), chip(s), and/or module(s) implemented in hardware and/or software, and preferably having at least one hardware component may be utilized in any device to perform one or more steps of the method 500 in the architecture 300. Illustrative processors include, but are not limited to, a central processing unit (CPU), an application specific integrated circuit (ASIC), a field programmable gate array (FPGA), etc., combinations thereof, or any other suitable computing device known in the art.

Architecture 300 includes a block diagram, showing a security optimization system, to which the invention principles may be applied. The architecture 300 comprises a client computer 302, a security optimization component 308 operational on a server computer 304 and a network 306 supporting communication between the client computer 302 and the server computer 304.

Client computer 302 can be any computing device on which software is installed for which an update is desired or required. Client computer 302 can be a standalone computing device, management server, a web server, a mobile computing device, or any other electronic device or computing system capable of receiving, sending, and processing data. In other embodiments, client computer 302 can represent a server computing system utilizing multiple computers as a server system. In another embodiment, client computer 302 can be a laptop computer, a tablet computer, a netbook computer, a personal computer, a desktop computer or any programmable electronic device capable of communicating with other computing devices (not shown) within user persona generation environment via network 306.

In another embodiment, client computer 302 represents a computing system utilizing clustered computers and components (e.g., disk array storage, database server computers, application server computers, etc.) that act as a single pool of seamless resources when accessed within install-time validation environment of architecture 300. Client computer 302 can include internal and external hardware components, as depicted and described in further detail with respect to FIG. 5.

Server computer 304 can be a standalone computing device, management server, a web server, a mobile computing device, or any other electronic device or computing system capable of receiving, sending, and processing data. In other embodiments, server computer 304 can represent a server computing system utilizing multiple computers as a server system. In another embodiment, server computer 304 can be a laptop computer, a tablet computer, a netbook computer, a personal computer, a desktop computer, or any programmable electronic device capable of communicating with other computing devices (not shown) within install-time validation environment of architecture 300 via network 306.

Network 306 can be, for example, a local area network (LAN), a wide area network (WAN) such as the Internet, a storage area network (SAN), or a combination of these network types, and can include wired, wireless, or fiber optic connections. In general, network 306 can be any combination of connections and protocols that will support communications between client computer 302 and server computer 304.

Security optimization component 308, operational on server computer 304, can negotiate a security policy between endpoints. Should the negotiation fail, security optimization component 308 can request security capabilities of an endpoint and analyze the provided capabilities to determine capabilities that match the security capabilities of another endpoint.

Security optimization component 308 can provide notification to interested parties (e.g., interested Information Technology (IT) personnel) of security negotiation failures, security analysis of one or more endpoints, security policies that are unable to operate and recommended security policy upgrades for an endpoint. It should be noted that these embodiments can be implemented in a server communicatively connected to the endpoints or in the endpoints directly. It should further be noted that these embodiments can store endpoint security capabilities on a server for later analysis and the stored information can be updated as security capabilities of an endpoint change.

FIG. 4 is an exemplary detailed architecture for performing various operations of FIG. 5, in accordance with various embodiments. The architecture 400 may be implemented in accordance with the present invention in any of the environments depicted in FIGS. 1-3 and 5, among others, in various embodiments. Of course, more or less elements than those specifically described in FIG. 4 may be included in architecture 400, as would be understood by one of skill in the art upon reading the present descriptions.

Each of the steps of the method 500 (described in further detail below) may be performed by any suitable component of the architecture 400. A processor, e.g., processing circuit(s), chip(s), and/or module(s) implemented in hardware and/or software, and preferably having at least one hardware component, may be utilized in any device to perform one or more steps of the method 500 in the architecture 400. Illustrative processors include, but are not limited to, a central processing unit (CPU), an application specific integrated circuit (ASIC), a field programmable gate array (FPGA), etc., combinations thereof, or any other suitable computing device known in the art.

Architecture 400 provides a detailed view of at least some of the modules of architecture 300. Architecture 400 can comprise a security optimization component 308, which can further comprise a security negotiation component 402, a security analysis component 404 and a security notification component 406.

In another aspect of an embodiment of the present invention, security negotiation component 402 can request security capabilities from one or more endpoints and can attempt to establish a secure connection between two endpoints. It should be noted that security negotiation component 402 can request the security capabilities regardless of whether security is successfully enabled between endpoints. For example, on a failure to enable security, a first endpoint can send a second endpoint a request for the second endpoint's security capabilities. In one aspect, the security capabilities can include, but are not limited to, security levels, e.g., encryption algorithm, security options enabled, etc. and policy settings, e.g., permitted algorithms, permitted security options, etc. It should be noted that this request could take the form of a new Extended Link Service (ELS) command or as a new descriptor in the "Read Diagnostic Parameters" ELS, etc.

In the case where the secure connection is established, the received security capabilities can be used to determine, by security analysis component 404, if the optimal level of security is in use. It should be noted that the level of security required to establish and/or maintain a connection between endpoints can be initially set to predetermined values and dynamically changed after a connection is established. It should be noted that a determination that one endpoint has a better security capability available can indicate that the other endpoint is older hardware/firmware and may require update or replacement. For example, the current use of encryption, such as, but not limited to IBM Fibre Channel Endpoint Security, breaks channel extension technology because header data cannot be read if encrypted. If a future security level provided for not encrypting certain predetermined portions of a message, then channel extension technology could be re-enabled.

In another aspect of a successfully established secure connection, security analysis component 404 can request historical security connection data associated with prior connections. Security analysis component 404 can then compare the historical security connection data to the current connection data and determine if suboptimal levels of security are no longer in use, e.g., hardware and/or firmware has been upgraded, along for the use of better security levels.

In the case where the secure connection is not established, the received security capabilities can be used to determine, by security analysis component 404, the reason for the failure. It should be noted that a failure determination can be based on factors such as, but not limited to, security levels and policy settings of the endpoints. Security analysis component 404 can compare the security levels and policy settings returned by the endpoints to determine why a connection is not possible, e.g., no matching security levels or misconfigured policy settings.

In one aspect of an embodiment of the present invention, security notification component 406 can receive information from security analysis component 404 indicating that a security negotiation has failed. Security notification component 406 can prepare a notification indicating the reasoning, determined by security analysis component 404, why the security negotiation failed and propose changes to one or more endpoints allowing for a successful security negotiation. For example, the notification can include security levels and policy settings such as, but not limited to, algorithms, options, etc.

In another aspect of an embodiment of the present invention, security notification component 406 can receive information from security analysis component 404 indicating that a security negotiation has succeeded. Security notification component 406 can prepare a notification indicating an analysis of the security connection in view of the capabilities of the endpoints. Security notification component 406 can include recommendations and/or warnings for changes to one or more endpoints allowing a security negotiation to a better security level, including any necessary adjustments to policy settings. For example, a warning can be incorporated into the report indicating an endpoint is not using the most secure option supported by the endpoint.

In another aspect of an embodiment of the present invention, security notification component 406 can receive information from security analysis component 404 indicating that a security negotiation has succeeded. Security notification component 406 can prepare a notification indicating an analysis of the security connection in view of the historical configurations of the endpoints. Security notification component 406 can provide information indicating that older, less secure, security levels are no longer in use by the endpoints, i.e., upgrades to hardware and/or firmware have been successfully deployed.

FIG. 5 is an exemplary flowchart of a method 500 for providing notification of endpoint security negotiation failure and the reason for the negotiation failure based on querying endpoints for their security capabilities. At step 502, an embodiment can query, via security negotiation component 402, endpoints for their security capabilities. At step 504, the embodiment can analyze, via security analysis component 404, differences between the security capabilities of the different endpoints. At step 506, the embodiment can negotiate, via security negotiation component 402, an agreeable security level and policy settings for the endpoints. At step 508, the embodiment can determine, via security negotiation component 402, if the security negotiation was successful. At step 510, the embodiment can, responsive to the negotiation failing, can send, via security notification component 406, a notice describing the negotiation failure and including reasoning why the negotiation failed.

Figure 6:
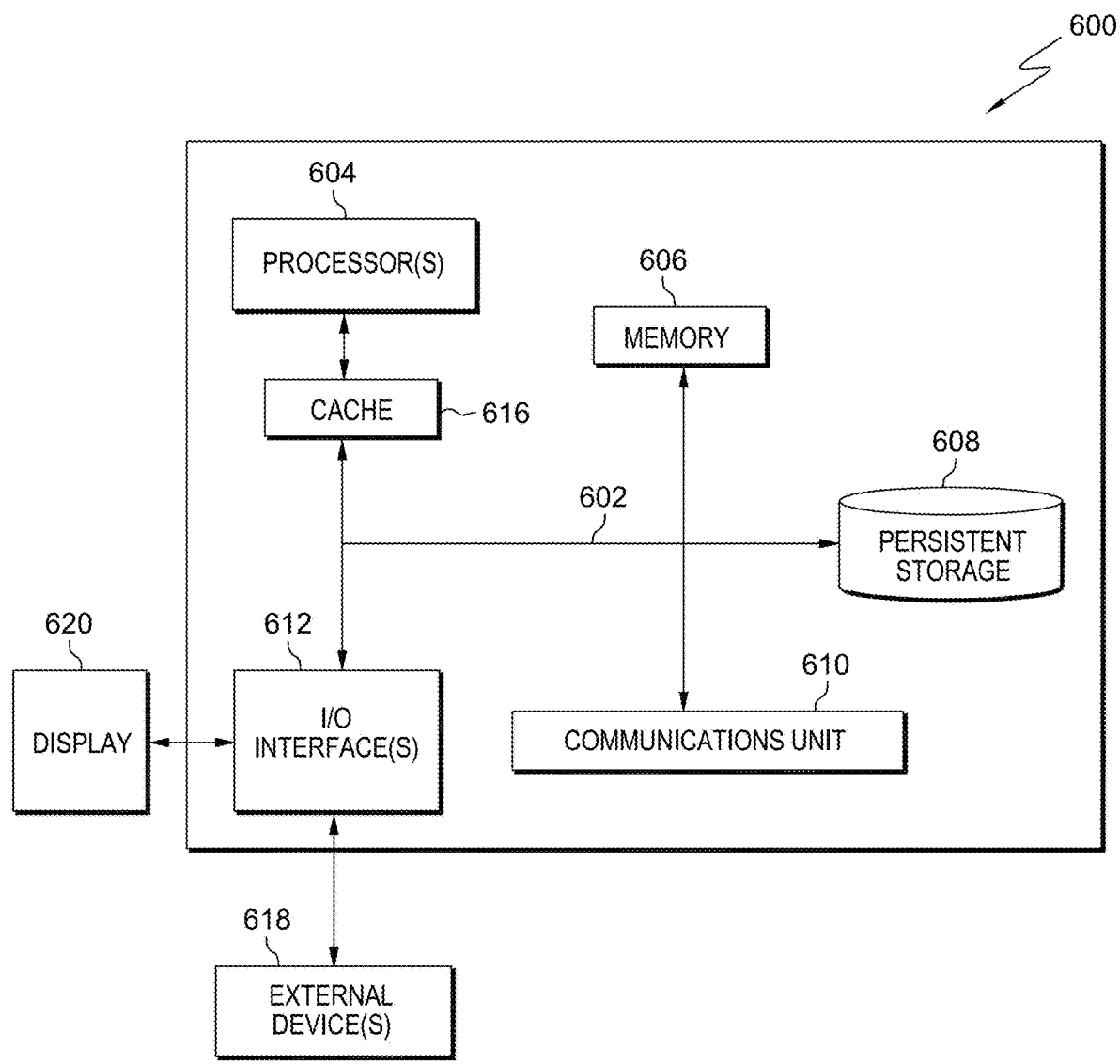
FIG. 6 is a block diagram of internal and external components of a data processing system in which embodiments described herein may be implemented, according to embodiments of the present invention.

FIG. 6 depicts computer system 600, an example computer system representative of client computer 302 and server computer 304. Computer system 600 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Computer system 600 includes processors 604, cache 616, memory 606, persistent storage 608, communications unit 610, input/output (I/O) interface(s) 612 and communications fabric 602. Communications fabric 602 provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of processors 604 by holding recently accessed data, and data near recently accessed data, from memory 606.

Program instructions and data used to practice embodiments of the present invention may be stored in persistent storage 608 and in memory 606 for execution by one or more of the respective processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 608 through communications unit 610.

I/O interface(s) 612 allows for input and output of data with other devices that may be connected to each computer system. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O interface(s) 612. I/O interface(s) 612 also connect to display 620.

Display 620 provides a mechanism to display data to a user and may be, for example, a computer monitor.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for improving endpoint security, the computer-implemented method comprising:
   requesting security capabilities from one or more endpoints;
   analyzing a difference between the security capabilities;
   negotiating a security capability supported by the one or more endpoints;
   determining if the negotiating succeeded;
   responsive to the negotiating succeeding, dynamically changing a security level between the one or more endpoints to a higher security level based on at least one of endpoint hardware or endpoint firmware capabilities;
   responsive to the negotiating not succeeding, creating a report describing capabilities associated with the one or more endpoints and suggesting changes for at least one of the one or more endpoints and sending the report to predetermined interested personnel.

2. The computer-implemented method of claim 1, further comprising:
   responsive to the negotiating succeeding, creating a report describing warnings associated with any of the one or more endpoints not using the most secure option supported by an endpoint.

3. The computer-implemented method of claim 2, further comprising:
   retrieving historical data associated with the one or more endpoints prior security capability use; and
   responsive to the negotiating succeeding, enhancing the report with notifications describing any of the one or more endpoints using newer security capabilities.

4. The computer-implemented method of claim 1, wherein the security capabilities comprise security levels and policy settings.

5. The computer-implemented method of claim 1, further comprising:
   storing the security capabilities associated with the one or more endpoints as historical data.

6. The computer-implemented method of claim 2, wherein the report further describes upgrade options for endpoints requiring a security level lower than other endpoints.

7. The computer-implemented method of claim 1, wherein requesting security capabilities comprises at least one of an Extended Link Service (ELS) command or a predetermined descriptor in a Read Diagnostics Parameters ELS.

8. A computer program product for improving endpoint security, the computer program product comprising:
   one or more non-transitory computer readable storage media and program instructions stored on the one or more non-transitory computer readable storage media, the program instructions comprising:
   program instructions to request security capabilities from one or more endpoints;
   program instructions to analyze differences between the security capabilities;
   program instructions to negotiate a security capability supported by the one or more endpoints;
   program instructions to determine if the negotiation succeeded;
   responsive to the negotiating succeeding, program instructions to dynamically change a security level between the one or more endpoints to a higher security level based on at least one of endpoint hardware or endpoint firmware capabilities; and
   responsive to the negotiation failing, program instructions to create a report describing capabilities associated with the one or more endpoints and suggesting changes for at least one of the one or more endpoints and to send the report to predetermined interested personnel.

9. The computer program product of claim 8, further comprising:
   responsive to the negotiation succeeding, program instructions to create a report describing warnings associated with any of the one or more endpoints not using the most secure option supported by an endpoint.

10. The computer program product of claim 9, further comprising:
    program instructions to retrieve historical data associated with the one or more endpoints prior security capability use; and
    responsive to the negotiation succeeding, program instructions to enhance the report with notifications describing any of the one or more endpoints using newer security capabilities.

11. The computer program product of claim 8, wherein the security capabilities comprise security levels and policy settings.

12. The computer program product of claim 8, further comprising:
    program instructions to store the security capabilities associated with the one or more endpoints as historical data.

13. The computer program product of claim 9, wherein the report further describes upgrade options for endpoints requiring a security level lower than other endpoints.

14. The computer program product of claim 8, wherein requesting security capabilities comprises at least one of an Extended Link Service (ELS) command or a predetermined descriptor in a Read Diagnostics Parameters ELS.

15. A computer system for improving endpoint security, the computer system comprising:
    one or more computer processors;
    one or more non-transitory computer readable storage media; and
    program instructions stored on the one or more non-transitory computer readable storage media, the program instructions comprising:
    program instructions to request security capabilities from one or more endpoints;
    program instructions to analyze a difference between the security capabilities;
    program instructions to negotiate a security capability supported by the one or more endpoints;
    program instructions to determine if the negotiation succeeded;
    responsive to the negotiating succeeding, program instructions to dynamically change a security level between the one or more endpoints to a higher security level based on at least one of endpoint hardware or endpoint firmware capabilities; and responsive to the negotiation failing, program instructions to create a report describing capabilities associated with the one or more endpoints and suggesting changes for at least one of the one or more endpoints and to send the report to predetermined interested personnel.

16. The computer system of claim 15, further comprising: responsive to the negotiation succeeding, program instructions to create a report describing warnings associated with any of the one or more endpoints not using the most secure option supported by an endpoint.

17. The computer system of claim 16, further comprising: program instructions to retrieve historical data associated with the one or more endpoints prior security capability use;

responsive to the negotiation succeeding, program instructions to enhance the report with notifications describing any of the one or more endpoints using newer security capabilities; and program instructions to store the security capabilities associated with the one or more endpoints as historical data.

18. The computer system of claim 15, wherein the security capabilities comprise security levels and policy settings.

19. The computer system of claim 16, wherein the report further describes upgrade options for endpoints requiring a security level lower than other endpoints.

20. The computer system of claim 15, wherein requesting security capabilities comprises at least one of an Extended Link Service (ELS) command or a predetermined descriptor in a Read Diagnostics Parameters ELS.

* * * * *